United States Patent Office 3,754,027
Patented Aug. 21, 1973

3,754,027
α-HYDRAZINO-ORNITHINE AND
PRECURSORS THEREOF
John Johansson, Palo Alto, and Wilfred A. Skinner,
Portola Valley., Calif., assignors to Stanford Research
Institute, Menlo Park, Calif.
No Drawing. Filed Mar. 10, 1972, Ser. No. 233,761
Int. Cl. C07c 101/24
U.S. Cl. 260—534 R                    4 Claims

ABSTRACT OF THE DISCLOSURE

Disclosed as novel compounds are $N^\delta$-benzyloxycarbonyl-ornithine, 2-bromo-N-benzyloxycarbonyl-5-aminopentanoic acid, $N^\delta$-benzyloxycarbonyl - α - hydrazino-ornithine, and α-hydrazino-ornithine, together with its salts. The first three of these compounds have utility as intermediates in the preparation of the α-hydrazino-ornithine compounds. The latter compounds have utility as microbicides and as inhibitors of ornithine decarboxylase.

SUMMARY OF THE INVENTION

The present invention is based on the discovery of certain novel compounds which are derivatives of ornithine. These novel compounds, together with their respective structural formulas, are as follows:

$N^\delta$-benzyloxycarbonyl-ornithine,

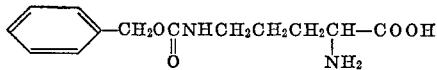

2-bromo-N-benzyloxycarbonyl-5-aminopentanoic acid,

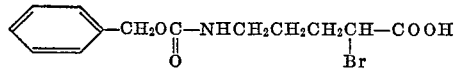

$N^\delta$-benzyloxycarbonyl-α-hydrazino-ornithine, and

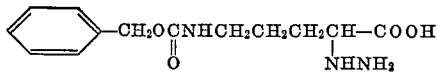

α-hydrazino-ornithine and its salts,

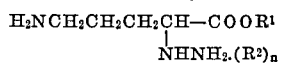

wherein $R^1$ represents hydrogen, ammonium (—$NH_4$) or alkali metal, wherein $R^2$ represents a mineral acid, and $n$ has a value of 0 or 1. The first three of the compounds enumerated above have utility as precursors leading to the production of the α-hydrazino-ornithine compounds. The latter compounds have been found to have utility as microbicides and are effective in the control of microorganisms such as E. coli, Enterobacter, Klebsiella, and Staphylococcus aureus. Of particular interest is the fact that the α-hydrazino-ornithine compounds act as good inhibitors of the ornithine decarboxylase enzyme as derived from a variety of sources, including E. coli, rat prostate and chick embryo.

The manner in which the compounds of this invention can be prepared is fully set forth in the examples given below. As indicated in Example 4, α-hydrazino-ornithine has the ability to readily form salts of either the carboxylate or the amine type. In the former case, the hydrogen of the carboxyl group (as indicated by $R^1$ above) is replaced by ammonium (—$NH_4$) or by an alkali metal such as Na, K or Li. Amine salts can be formed (as indicated at $R^2$) with mineral acids such as hydrochloric acid, nitric acid, phosphoric acid or sulfuric acid, for example. The salts are solid compounds, of good solubility in water and ethanol, which are, in many cases, easier to work with than the parent compound, α-hydrazino-ornithine, which is an oil. However, the latter compound also has a certain amount of water solubility and is soluble in ethanol, among other solvents.

Example 1.—$N^\delta$-benzyloxycarbonyl-ornithine

A solution of L(+) ornithine hydrochloride (33.7 g., 0.2 mole) in 1500 ml. of water was heated under reflux with 60 g. of basic cupric carbonate for 3 hours. The reaction mixture was filtered while hot and the solid was washed with 150 ml. of hot water. To the cooled filtrate was added 60 g. of sodium bicarbonate and a solution of benzylchloroformate (51.2 g., 0.3 mole) in 1500 ml. of acetone. The reaction mixture was stirred at room temperature for 14 hours. The solid copper complex which formed was collected and washed thoroughly with water, acetone and ether to yield 49.8 g. of solid product. The latter was suspended in 600 ml. of boiling water and treated with hydrogen sulfide for about 0.5 hour, followed by heating to get rid of excess hydrogen sulfide. Concentrated hydrochloric acid (15 ml.) was added and the mixture was filtered with the help of celite. After cooling, the filtrate was adjusted with 5 N sodium hydroxide to a pH of 6, where the free acid separated. As recrystallized from ethanol-water (50/50), there was obtained 26.8 g. of a product identified as N-benzyloxycarbonyl-ornithine. This compound, a white crystalline solid with a melting point of 228–230° C., is substantially insoluble in water. It is soluble in ethanol, in ethanol-water, and in various other organic solvents. Identity of the compound is confirmed by elemental analysis, as follows:

Analysis.—Calcd. for $C_{13}H_{18}N_2O_4$ (percent): C, 58.63; H, 6.81; N, 10.52. Found (percent), C, 58.61; H, 6.75; N, 10.56.

Example 2.—2-bromo-N-benzyloxycarbonyl-5-aminopentanoic acid

The $N^\delta$-benzyloxycarbonyl-ornithine of Example 1 (26.6 g., 0.10 mole) and KBr (41.6 g., 0.35 mole) were dissolved in 410 ml. (0.52 mole) of 2.5 N sulfuric acid. To this solution was added 11.2 g. (0.16 mole) of sodium nitrite in portions during one hour with stirring and ice-cooling. Stirring was continued for another 2 hours at room temperature. The pale yellow oil that formed was washed with water by means of decantation until free from bromine ions. It is identified as 2-bromo-N-benzyloxycarbonyl-5-aminopentanoic acid having a molecular weight of 330.2. It is insoluble in water and soluble in ethanol.

Example 3.—$N^\delta$-benyloxycarbonyl-α-hydrazino-ornithine

The 2-bromo-N-benzyloxycarbonyl-5-aminopentanoic acid of Example 2 (39.6 g., 0.12 mole) was dissolved in 150 ml. of methanol. To this solution was added a mixture of 19 g. of 95% hydrazine and 5 ml. of water. The reaction mixture was stirred for 48 hours at room temperature, warmed to 50° C. for 4 hours and finally stirred at room temperature for 10 days. The solvent was evaporated under vacuum leaving a yellow syrup. This was acidified with hydrochloric acid, dissolved in water and adjusted with 5 N sodium hydroxide to pH 5.8, where the free hydrazino acid precipitated yielding 4.6 g. of a crude product. Recrystallization from ethanol-water gave 4.3 g. (13.5%) yield of a water and ethanol soluble white solid product having a melting point of 161–164° C., which is identified as $N^\delta$-benzyloxycarbonyl-α-hydrazino-ornithine (in hydrate form). This identity is confirmed by elemental analysis, which gave the following results:

Analysis.—Calcd. for $C_{13}H_{19}N_3O_4 \cdot \frac{1}{2}$-$H_2O$ (percent): C, 53.78; H, 6.94; N, 1447. Found (percent): C, 53.66; H, 7.06; N, 14.61.

Example 4.—α-hydrazino-ornithine, α-hydrazino-ornithine ammonium salt, α-hydrazino-ornithine hydrogen chloride salt To hydrobromic acid (30–32%) in 100 ml. of acetic acid was added 4 g. (14.4 mm. mole) of the N⁶-benzyloxycarbonyl-α-hydrazino-ornithine of Example 3 in small portions. After this addition, the reaction mixture was stirred for 30 minutes and then treated with a large amount of ether in order to precipitate the amino acid dihydrobromide. The salt was washed two times with ether. The crude product was solved in 200 ml. of water and stirred with Dowex 50 ion exchange resin in H⁺ form (a product of The Dow Chemical Company) for 2 hours. The resin was filtered off and washed with water until free from acid, and then stirred with 200 ml. of 5 N ammonium hydroxide for 15 minutes. The resin was filtered off and washed with a small amount of water. The combined filtrate was then evaporated in vacuole to dryness. The residue, a white solid, is identified by infrared and nuclear magnetic resonance analysis as the ammonium salt of α-hydrazino-ornithine. The salt was then dissolved in water to which is added 1 N hydrochloric acid. This initially converts the salt to the free acid form, i.e., to α-hydrazino-ornithine, as the isoelectric pH point is reached. This compound is an oil, somewhat soluble in water and soluble in ethanol, which is identified by infrared and nuclear magnetic resonance methods of analysis. As more of the hydrochloric acid is now added, the pH is brought down to a level of 5.7 and the solvent is again evaporated. The residue is recrystallized from ethanol-water (50/50) to give 1.2 g. (46%) yield of a white crystalline product having a melting point of 163–166° C. which is soluble in water, moderately soluble in ethanol and unsoluble in ethyl ether, and which is identfiied as α-hydrazino-ornithine.HCl. This identification is confirmed by elemental analysis, as follows:

*Analysis.*—Calcd. for $C_5H_{13}N_3O_2 \cdot HCl$ (percent): C, 32.70; H, 7.68; N, 22.88. Found (percent): C, 32.73; H, 7.95; N, 22.68.

In a fashion similar to that described above in Example 5, alkali metal salts of α-hydrazino-ornithine can be prepared using reactants such as the alkali metal hydroxides or compounds rather than recited ammonium hydroxide. Similarly, use of a mineral acid other than HCl in the Example 4 preparation would yield the corresponding mineral acid salt of α-hydrazino-ornithine.

In vitro tests were conducted in which the α-hydrazino-ornithine compounds (usually in the form of the hydrogen chloride salt) were evaluated as bactericides. It was found that said compounds, at a concentration of 200 parts per million (p.p.m.) give complete control of *E. coli*. At this same concentration level, 95% control can be effected of *Staphylococcus aureus* and approximately 50% control of the Enterobacter microorganisms. At the reduced level of 100 p.p.m. of the active compound, 80% control can be obtained with the Klebsiella organism.

α-Hydrazino-ornithine has also been found to be an effective inhibitor of the enzyme, ornithine decarboxylase. Thus, at the concentrations of $3 \times 10^{-7}$ molar, $3 \times 10^{-6}$ molar, and $10^{-5}$ molar, approximately 50% inhibition is obtained of ornithine decarboxylase as derived, respectively, from *E. coli*, rate prostate, and chick embyro. By way of background, it has been reported that ornithine decarboxylase, the enzyme that forms putrescine from ornithine, showed a marked increase in activity in regenerating rat liver; thus, within 1 hour after partial hepatectomy, ornithine decarboxylase activity was tripled. In addition, some rapidly growing tumors have been found to have ornithine decarboxylase activities far greater than that of nonmalignant tissues. A recent study showed that ornithine decarboxylase activity in the rat ovary was stimulated by luteinizing hormone. It was therefore of interest to find that the α-hydrazino-ornithine compounds act as inhibitors of ornithine decarboxylase, for with the aid of this chemical it will be possible to better understand the role of this enzyme and the polyamines resulting from its action in rapidly growing tissues. A survey of the literature fails to uncover any reports of other inhibitors of ornithine decarboxylase.

We claim:
1. α-Hydrazino-ornithine compounds having the structure

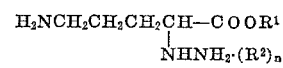

wherein R¹ represents hydrogen, ammonium or alkali metal, R² represents a mineral acid and n has a value of 0 or 1.

2. The compound of claim 1 which is α-hydrazino-ornithine ammonium salt.

3. The compound of claim 1 which is α-hydrazino-ornithine hydrogen chloride salt.

4. The compound of claim 1 which is α-hydrazino-ornithine.

References Cited
UNITED STATES PATENTS 3,330,857   7/1967   Hess _____ 260—471

LORRAINE A. WEINBERGER, Primary Examiner

P. J. KILLOS, Assistant Examiner

U.S. Cl. X.R.

260—482 C, 482 P; 424—319